US006080349A

United States Patent [19]

Bittner et al.

[11] Patent Number: 6,080,349

[45] **Date of Patent: *Jun. 27, 2000**

[54] MASKING TOOL FOR MANUFACTURING PRECISION GEARS AND METHOD FOR MAKING THE SAME

[75] Inventors: Edward H. Bittner, Madison; Walter S. Koscomb, III, Sandy Hook; George D. Mitchell, Jr., Oxford, all of Conn.

[73] Assignee: Sikorsky Aircraft Corporation, Stratford, Conn.

[ * ] Notice: This patent is subject to a terminal disclaimer.

[21] Appl. No.: 09/075,674

[22] Filed: May 11, 1998

Related U.S. Application Data

[62] Division of application No. 08/850,048, May 2, 1997.

[51] Int. Cl.$^7$ .............................. B32B 31/12; B32B 31/20

[52] U.S. Cl. .......................... 264/220; 264/255; 264/265; 264/266; 264/319; 264/320; 264/219; 118/504; 451/38

[58] Field of Search ..................................... 264/219, 241, 264/255, 265, 266, 319, 320, 220; 118/504; 451/38

[56] References Cited

U.S. PATENT DOCUMENTS

| | | | |
|---|---|---|---|
| 2,363,843 | 11/1944 | Duggan . | |
| 3,873,376 | 3/1975 | Ritzka | 148/16.5 |
| 5,140,781 | 8/1992 | Marsh et al. | 51/281 R |
| 5,785,771 | 7/1998 | Mitchell, Jr. et al. | 148/213 |

*Primary Examiner*—Jan H. Silbaugh
*Assistant Examiner*—Suzanne E. Mason
*Attorney, Agent, or Firm*—Brian A. Collins

[57] ABSTRACT

A masking tool (60) for use in combination with a shaped-workpiece (30$_S$) in the manufacture of a precision gear (10), which shaped workpiece (30$_S$) defines a plurality of gear teeth (12) and tooth space surfaces (68) defined by and between adjacent gear teeth (12). The masking tool (60) is, furthermore, operative to mask the tooth space surfaces (68) during surface deposition of a masking material (28) while facilitating deposition of the masking material (28) upon the top lands (14) of the gear teeth (12). The masking tool includes a flexible back-plate (64) and a plurality of compliant masking segments (62) bonded to and integrated by the flexible back-plate (64). Each of the compliant masking segments (62) define a surface geometry (66) which is substantially complementary to the respective tooth space surface (68). Furthermore, adjacent compliant masking segments (62) define an open-ended channel (70) therebetween. In use, the masking tool (60) is forcibly urged in combination with the precision gear (10) such that the compliant masking segments (62) are disposed in superposed engagement with the tooth space surfaces (68) for prohibiting deposition of the masking material thereupon, and the open-ended channels (70) permit deposition of the masking material (28) on the top lands (14) of the gear teeth (12). The masking tool (60) is fabricated by: forming an accurate representation of the shaped workpiece (30$_S$); preparing a surface of a flexible back-plate (64) so as to promote adhesion; situating the flexible back-plate (64) proximal to the gear teeth (12); and, forming a compliant material (62$_M$) between the flexible back-plate (64) and the tooth space surfaces (68) so as to produce the compliant masking segments (62).

2 Claims, 6 Drawing Sheets

MASKING TOOL FOR MANUFACTURING PRECISION GEARS AND METHOD FOR MAKING THE SAME

This invention is a divisional application of co-pending U.S. patent application Ser. No. 08/850,048, filed May 2, 1997, entitled MASKING TOOL FOR MANUFACTURING PRECISION GEARS AND METHOD FOR MANUFACTURING THE SAME.

RELATED APPLICATIONS

This invention is related to a co-pending, commonly-owned. U.S. patent application entitled "Method for Manufacturing Precision Gears", now U.S. Pat. No. 5,985,771.

TECHNICAL FIELD

This invention is directed to a tool for manufacturing precision gears, and, more particularly, to a masking tool for use in combination with a shaped workpiece in the manufacture of precision gears, and, more particularly, to a masking tool operative to mask predefined areas of a shaped workpiece during a surface deposition operation.

BACKGROUND OF THE INVENTION

The manufacture of precision gears for drive trains, e.g., helicopter rotor transmissions, involves multiple highly-controlled fabrication steps which necessitate the use of highly-sophisticated manufacturing equipment, e.g., cutting apparatus, carburizing vessels, quenching equipment, etc., and highly-skilled operators to perform each fabrication step. As such, precision gears are amongst the most complex and costly articles of manufacture to fabricate. The elimination or simplification of a single process step, or a process improvement which eliminates or reduces the number of rejected or scrapped workpieces, can produce significant fiscal benefits.

FIGS. 1*a*–1*f* pictorially illustrate various stages of fabricating a precision gear utilizing conventional manufacturing techniques. For simplicity, a small segment of the precision gear is shown, i.e., a segment corresponding to two gear teeth, but it should be understood that the entire precision gear is identically-formed. FIG. 1*a* depicts a steel gear blank or forging 102 having a thin layer of copper plate 104 deposited thereon. In a prior step, the steel forging 102 has undergone a conventional copper electro-plating process wherein the copper plate 104 has been deposited to a minimum thickness of about 0.0008 inches (0.0020 cm). As will be appreciated in the subsequent discussion and views, the copper plate 104 serves to mask predefined areas of the precision gear 100 (FIG. 1*f*) from exposure to one or more subsequent carburization cycles.

In FIG. 1*b*, the gear teeth 106 are rough-machined utilizing a standard reciprocating shaper-cutter 108 which mills the profile of the gear teeth 106, e.g., the drive and coast flank involutes and the fillet radius between each gear tooth 106. Such rough machining operation mills the gear tooth profile to within about 0.010 inches (0.0254 cm) of its final dimensions.

In FIG. 1*c*, an abrasive wheel cutter 109 is employed to chamfer and deburr the edges 110 of the gear tooth profile. Such chamfering operation serves to minimize stress concentrations in the completed precision gear 100.

As a result of the prior machining operations, the copper plate 104 remains in areas corresponding to the top land 112 and end faces 114 of each gear tooth 106. Yet another consequence of the machining operations, is the inadvertent removal of copper plate, shown as void areas 116 in FIGS. 1*c* and 1*d*, due to handling prior to and during such machining operations. In FIG. 1*d*, a delicate operation is performed to "touch-up" these unplated areas 116 with a carbon stop-off paint such as produced by Park Chemical Company under the tradename "NO-CARB". Such carbon stop-off paint is functionally equivalent to the copper plate 104 inasmuch as it serves to mask these unplated areas 116 from exposure during at least one subsequent carburization cycle.

In FIG. 1*e*, the machined/masked workpiece 118 has undergone a conventional carburization cycle wherein atomic carbon diffuses into the exposed surfaces of the gear teeth 106, e.g., the flanks 120, fillets 122, and chamfered edges 110 thereof. More specifically, the workpiece 118 is heated to an elevated temperature (i.e., about 1650–1800 degrees F, 899–982 degrees C) and placed in an atmosphere rich in carbon monoxide or hydrocarbon gases for a period of about 4 hours. During this process, the exposed surfaces 120, 122, 110 of the gear teeth 106 absorb atomic carbon to a depth of about 0.030 inches (0.076 cm) to about 0.060 inches (0.152 cm) while the copper plate 104 inhibits the absorption of carbon into the top lands 112 and end faces 114 of the precision gear 100. As such, the carburized areas, following a subsequent hardening step, provide a hard, wear-resistant surface while the uncarburized areas ensure that the core of the gear remains comparably soft to improve the toughness and durability of the precision gear 100.

In FIG. 1*f*, the precision gear 100 is shown in its finished form after having undergone several operations including tempering, copper stripping, heat treat/quenching, and/or final machining. The tempering operation involves heating the workpiece to an elevated temperature of about 1100 degrees F (593 degrees C) for a period of about 2 hours. Such tempering operation, which is performed following the carburization cycle and/or hardening operation, relieves residual stresses which develop as a result of the preceding operations. The copper stripping operation includes the step of chemically stripping the copper plate from the top lands 112 and end faces 114 of the workpiece in a cyanide bath. This operation may be viewed as an antithetical operation to the copper electro-plating process insofar as the polarity of the precision gear is reversed, i.e., is the anode in the electric circuit, to remove the copper plate. The heat treat/quenching operation includes the steps of elevating the temperature of the in-process workpiece to about 1650–1800 degrees F and rapidly quenching the heated workpiece in a cool oil. Such heat treat/quenching transforms the steel microstructure from austenite to martinsite. Insofar as the prior carburizing cycle locally increases the carbon content along the surfaces of the flanks 120 and fillets 122 of the gear teeth 106, the heat treat/quenching operation produces an extremely hard, wear resistant shell or "case" and a comparably ductile interior core. This combination improves the fatigue properties of the precision gear 100. The final operation involves machining the workpiece to its final dimensions. This step is generally performed utilizing a Cubic Boron Nitride (CBN) cutter having a shape corresponding the tooth space profile, i.e., the profile defined by and between two adjacent teeth 106.

The prior art manufacturing method presents certain fiscal and structural disadvantages. Firstly, the touch-up operation, shown in FIG. 1*d*, is a corrective step rather than a value-added step. That is, the touch-up operation corrects for the adverse consequences of prior machining/handling operations, and, accordingly, increases cost without adding benefit.

Secondly, the touch-up operation is painstakingly laborious and requires the skills of an artisan to ensure that all unplated areas have been addressed and/or that the carbon stop-off paint has not inadvertently spilled or run-off on surfaces to be carburized. Should the operator inadvertently overlook an unplated area 116, for example, along a top land 112 of a gear tooth, a local, high concentration of carbon will be diffused into the top land 112 during the carburization cycle. As such, the tip of the gear tooth becomes highly brittle following the heat treat/quenching operation and the hardened tip may result in "tooth capping" or "case-core separation". In yet another example, should the operator inadvertently spill the carbon stop-off paint on the flank 120 of a gear tooth, a local "soft-spot" will develop along the surface. As such, the gear tooth may spaul in this area when in operation. In either event, the precision gear 100 may fail prematurely, or, depending upon the severity of the defect, may require rework or be scrapped.

Finally, the chamfered edges 110 produced by the deburring/chamfering operation, shown in FIG. 1*c*, can also be a source of tooth capping insofar as a high carbon content can develop in the comers $\mathbf{110}_C$ of the chamfered edges 110. While the deburring/chamfering operation has the adverse affect of removing copper plate from these areas, it is desirable to perform such operation prior to carburization and/or heat treat/quenching when the precision gear is relatively malleable and easily machined. While hardening of the chamfered edges 110 could be avoided with the use of a carbon stop-off paint, such operation is typically deemed impractical based on the laborious nature of the touch-up operation. Furthermore, such operation produces an unacceptably high risk of error based on the probability that inadvertent spillage onto surfaces to be carburized is more likely to occur.

Accordingly, there is a constant search in the art for manufacturing tools and processes which eliminate or simplify fabrication steps, diminish the potential for fabrication errors, and improve the structural properties of a precision gear.

SUMMARY OF THE INVENTION

It is an object of the present invention to provide a masking tool for manufacturing precision gears which eliminates laborious operation steps, thereby reducing processing time and manufacturing costs.

It is another object of the present invention to provide such a masking tool which diminishes the potential for fabrication errors and, consequently, the requirement for rework of a precision gear or rejection thereof.

It is yet another object of the present invention to provide such a masking tool which ameliorates the structural properties a precision gear.

These and other objects are achieved by a masking tool for use in combination with a shaped-workpiece in the manufacture of a precision gear, which shaped workpiece defines a plurality of gear teeth and a tooth space surface defined by and between adjacent gear teeth. The masking tool is, furthermore, operative to mask the tooth space surfaces during surface deposition of a masking material while facilitating deposition of the masking material upon the top lands of the gear teeth.

The masking tool comprises a flexible back-plate and a plurality of compliant masking segments bonded to and integrated by the flexible back-plate. Each of the compliant masking segments define a surface geometry which is substantially complementary to the tooth space surface. Furthermore, adjacent compliant masking segments define an open-ended channel therebetween. In use, the masking tool is forcibly urged in combination with the precision gear such that the compliant masking segments are disposed in superposed engagement with the tooth space surfaces for prohibiting deposition of the masking material thereupon, and the open-ended channels permit deposition of the masking material on the top lands of the gear teeth.

A method for manufacturing the masking tool is also disclosed comprising the steps of: forming an accurate representation of the shaped workpiece defining tooth space surfaces; preparing a surface of a flexible back-plate so as to promote adhesion; situating the flexible back-plate proximal to the gear teeth; and, forming a compliant material between the flexible back-plate and the tooth space surfaces so as to produce the compliant masking segments.

BRIEF DESCRIPTION OF THE DRAWINGS

A more complete understanding of the present invention and the attendant features and advantages thereof may be had by reference to the following detailed description of the invention when considered in conjunction with the following drawings wherein.

BEST MODE FOR CARRYING OUT THE INVENTION

A method for manufacturing a precision gear is described including an inventive masking tool useful for practicing the method together with a method for manufacturing the masking tool. The exemplary embodiment described herein relates to manufacturing a gear shaft having dual-timed precision spur gears, however, it should be appreciated that the invention is applicable to any gear-type such as a helical, spline, bevel, spiral bevel, or face gear.

Method for Manufacturing a Precision Gear

Figure 1C:
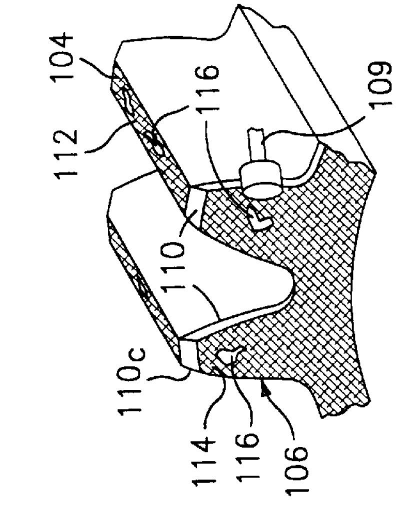
FIGS. 1*a*–1*f* depict a conventionally-fabricated precision gear at various stages of its manufacture.
Figure 1B:
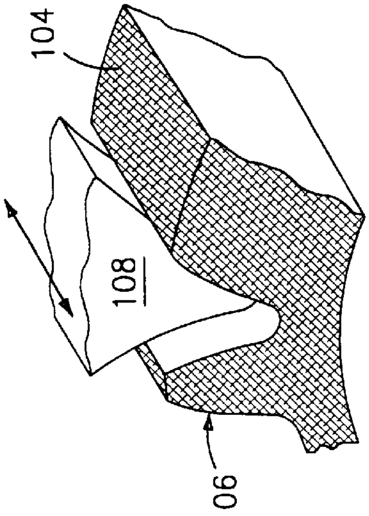
Figure 1A:
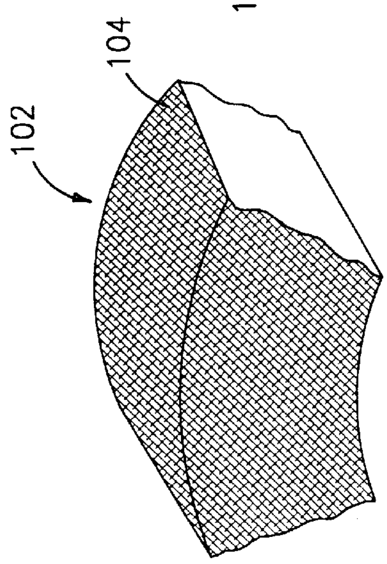
Figure 1F:
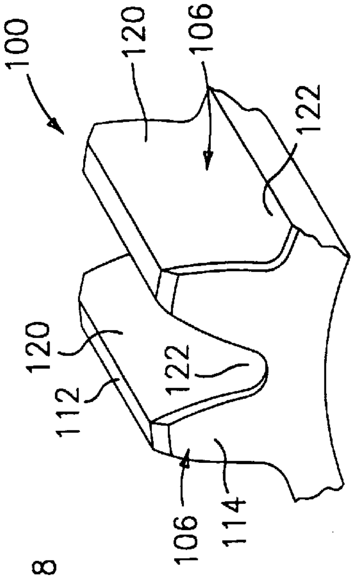
Figure 1E:
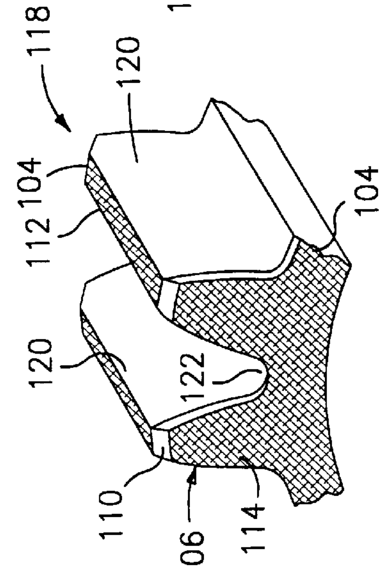
Figure 1D:
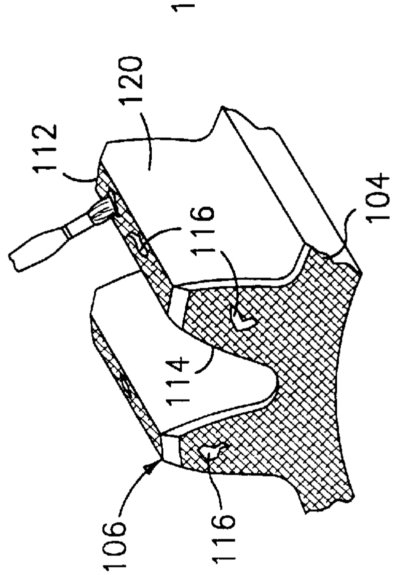
Figure 2:
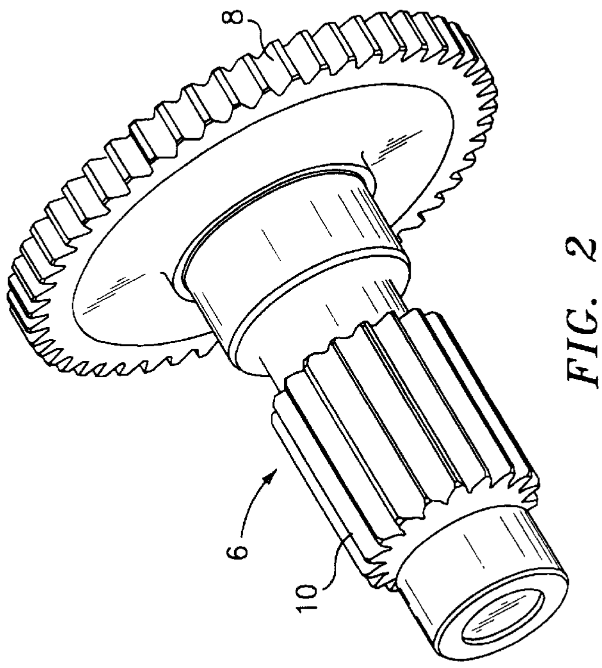
FIG. 2 depicts a gear shaft having precision spur gears manufactured according to the teachings of the present invention.

FIG. 2 depicts a gear shaft 6 having a web end spur gear 8 and a shaft end spur gear 10 which are precisely fabricated, i.e., to within a manufacturing tolerance of about (0.0005 inches (0.00127 cm) for dual-synchronous operation. In the described embodiment, the gear shaft 6 is fabricated from a steel alloy such as 9310 steel or Pyroware™(produced by Carpenter Steel), although, the method described herein is applicable to any metallic precision gear wherein surface hardening is a desired structural property.

Figure 3:
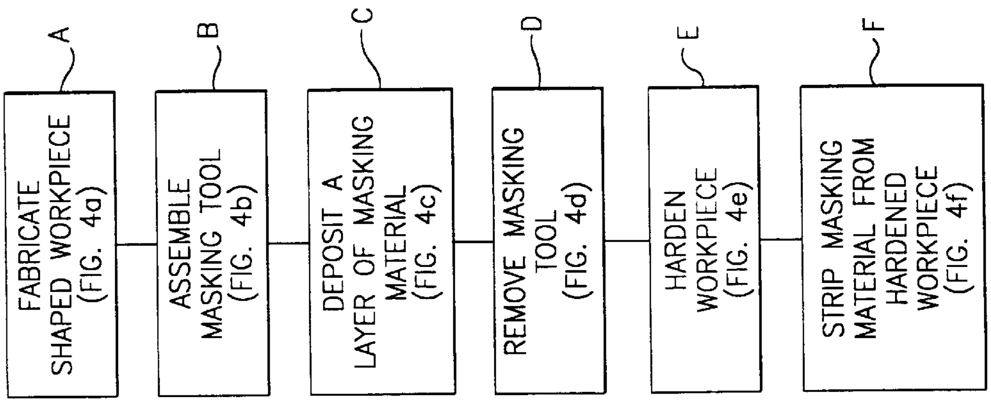
FIG. 3 depicts a flow diagram of the operational steps of the method employed for fabricating the precision gear including the use of a masking tool according to the present invention.

To facilitate the discussion, the manufacturing steps will be described in connection with the shaft end spur gear 10, however, it should be understood that the web end spur gear 8 may be similarly formed. In FIGS. 3 and 4*a*–4*e*, an exemplary embodiment of the manufacturing method is shown wherein FIG. 3 depicts the essential operational steps for manufacturing such precision spur gear 10 and FIGS. 4*a*–4*e* pictorially illustrate a small segment of the spur gear 10 (corresponding to two gear teeth) at various stages of its manufacture.

Figures 4A, 4B, 4C, 4D, 4E, 4F:
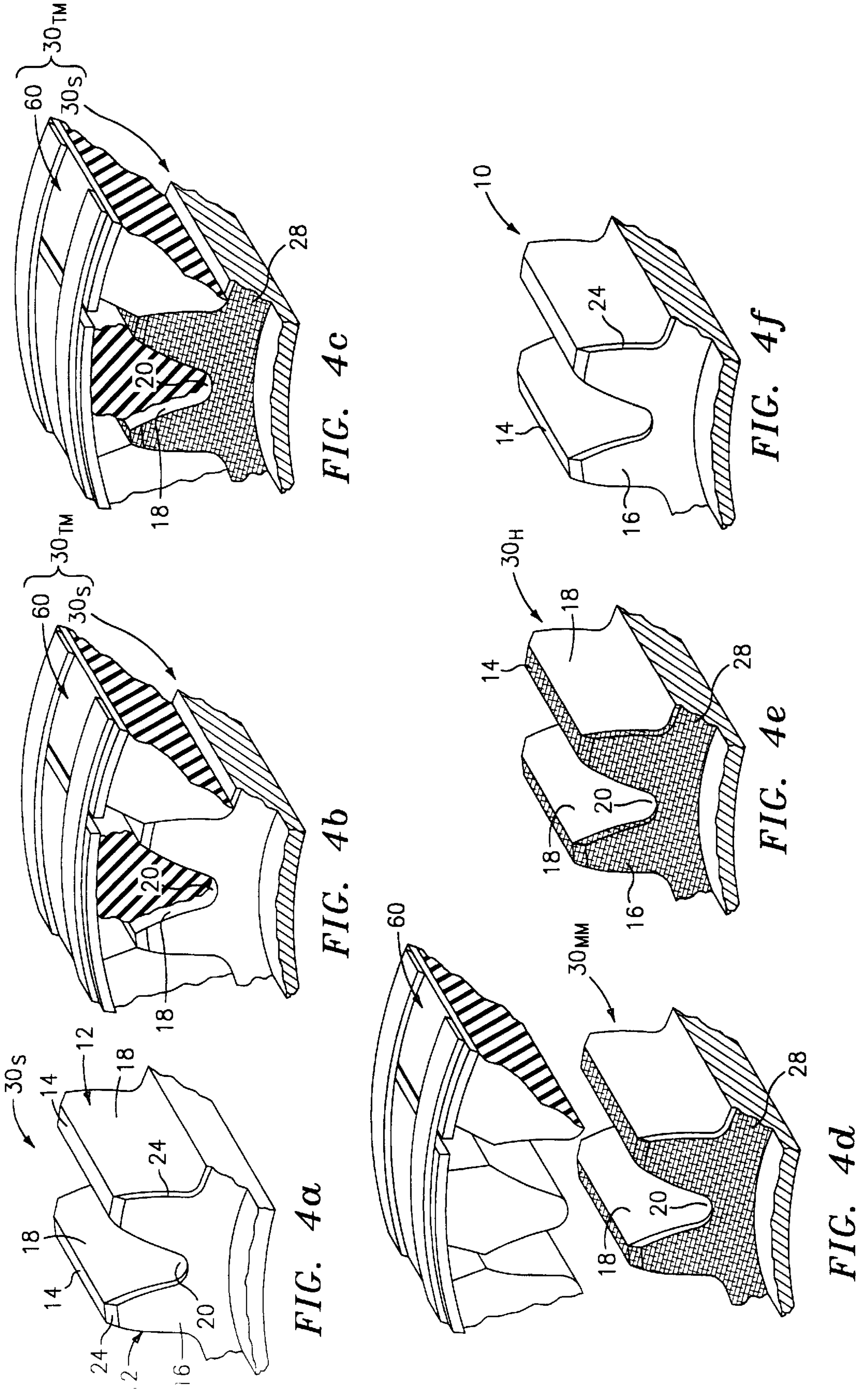
FIGS. 4*a*–4*f* pictorially illustrate the various stages of manufacturing a shaft end spur gear of the gear shaft.

More specifically, in FIGS. 3 and 4*a*, a first step A involves fabricating a shaped workpiece $\mathbf{30}_S$ defining the three dimensional geometry of the gear teeth 12, e.g., the top land 14, end faces 16, and flanks 18 of each gear tooth 12, the fillet 20 between adjacent gear teeth 12, and any chamfered or smoothed surfaces 24 (if desired). This fabrication step A may be performed utilizing a variety of techniques, e.g., shaping, hobbing, generating, or precision casting, though, in the preferred embodiment, a steel gear blank (not shown) is machined utilizing conventional precision machining equipment. For example, a lathe (not shown) may be used to turn the outer diameter, and consequently, the top lands 14 of the gear teeth 12, a reciprocating shaper cutter (not shown) may be employed to machine the tooth space profile, e.g., the flanks 18 and fillets 20, and an abrasive wheel cutter (also not shown) may be used to deburr and form any chamfered surfaces 24. If a significant degree of gear distortion is anticipated by subsequent operational steps, the gear teeth may be rough-formed to within about (0.010 inches (0.0254 cm) of the desired final dimensions, and, subsequently, final-formed to remove inaccuracies caused by such distortion.

In FIGS. 3 and 4*b*, a subsequent step B includes the assembly of a masking tool 60 about the shaped workpiece $\mathbf{30}_S$. The masking tool 60, which will be discussed in greater detail hereinafter, is disposed in superposed engagement with the flanks 18 and fillets 20 of the shaped workpiece $\mathbf{30}_S$ and, functionally, serves to mask these surfaces 18, 20 from exposure during a subsequent surface deposition step. In FIGS. 3 and 4*c*, a next step C includes depositing a thin layer of masking material 28 to the remaining exposed surfaces of the shaped workpiece $\mathbf{30}_S$, i.e., the tops lands 12, the end faces 16 and any chamfered surfaces 24, via an immersion process. In the context used herein, an immersion process is any method which immerses the entire tool-masked workpiece $\mathbf{30}_{TM}$ in a fluidic or gaseous solution to coat or cover all such exposed surfaces 12, 16, 24. For example, the surface deposition step C may include immersing the tool-masked workpiece $\mathbf{30}_{TM}$ in a fluid bath of carbon stop-off paint which, upon removal and room temperature curing thereof, serves as the masking material 28. Yet another example includes electrolytic deposition wherein the tool-masked workpiece $\mathbf{30}_{TM}$ is immersed in a electrolytic solution for depositing a thin layer of metal plate, e.g., copper, zinc, or nickel. In the preferred embodiment, the masking material 28 is deposited by copper electro-plating wherein copper plate is deposited to a minimum thickness of about 0.0008 inches (0.0020 cm). Such masking material 28 will serve to mask such surfaces 12, 16, 24 from exposure during a subsequent hardening step.

Referring to FIGS. 3 and 4*d*, a next step D involves removing the masking tool 60 from the material-masked workpiece $\mathbf{30}_{MM}$ so as to expose the flank and fillet surfaces 18, 20 thereof. Furthermore, the material-masked workpiece $\mathbf{30}_{MM}$ may be cleaned in preparation for a subsequent hardening step E. In FIGS. 3, 4*d* and 4*e*, the hardening step E comprises any one of a variety of conventional hardening techniques, e.g., carburizing, nitriding, etc., which produce a surface-hardened casing or shell and a comparably ductile interior core. In the described embodiment, such surface-hardening is produced only in those areas corresponding to the exposed flank and fillet surfaces 18, 20 of the hardened workpiece $\mathbf{30}_H$. In the preferred embodiment, the hardening step E involves the substeps of carburizing the material-masked workpiece, and heat treat/quenching the carburized workpiece (these intermediate steps are not shown in FIGS. 3, 4*d* and 4*e*). More specifically, the material-masked workpiece is placed in a carburizing vessel wherein, at elevated temperatures of about 1700 degrees F, the workpiece is exposed to a carbon-rich atmosphere for a period of about four (4) hours. During the carburization cycle, atomic carbon is diffused into the exposed surfaces 18, 20 of the material-masked workpiece to a depth of about 0.030 inches (0.076 cm) to about 0.060 inches (0.152 cm). Furthermore, the masking material 28 inhibits the absorption of carbon into the top lands 14 and end faces 16 of the precision gear 10. The heat treat/quenching operation comprises the substeps of elevating the temperature of the workpiece to about 1650–1800 degrees F and rapidly quenching the heated workpiece in a cool oil. Such heat treat/quenching operation transforms the steel microstructure from a soft austenite to a hard martinsite.

In FIGS. 3, 4*e* and 4*f*, a final step E includes stripping the masking material 28 from the hardened workpiece $\mathbf{30}_H$ to form the finished precision gear 10. Such stripping step E may be performed using any one of a variety of stripping methods, though, in the preferred embodiment a reverse-electroplate operation is performed to remove the copper plate. Such operation typically involves reversing the polarity of the workpiece $\mathbf{30}_H$, i.e., positively charging the workpiece $\mathbf{30}_H$, so as to drive the copper plate therefrom.

In addition to the above described steps A–F, it will be appreciated that other conventional processing steps may be required to achieve the desired geometry and/or structural properties of the precision gear 10. For example, it may be desirable to temper the in-process workpiece several times during the manufacturing process to relieve residual stresses therein which may result from a prior step, e.g., carburizing or hardening. Furthermore as mentioned above, if the shaped workpiece is rough-formed at step A, it will be necessary to finish-form, i.e., finish machine, the precision gear at a subsequent step, typically after the hardening step E. Furthermore, it may be desirable to mask the entire in-process workpiece, e.g., with copper plate, to prevent additional carbon from being absorbed during the heat treat operation. With respect thereto, it will be appreciated that a heat treat furnace may produce carbonaceous fumes which could be absorbed by the carburized workpiece if not suitably masked. Moreover, while the steps A through D discussed above must necessarily be performed in the order described, steps E, F and the substeps thereof may be performed in other sequences. For example, the stripping step F may be performed prior to a heat treat/quenching substep.

Masking Tool and Assembly thereof

FIGS. 5*a*–5*e* depict the assembly of the masking tool 60 about the web end spur gear of the gear shaft, which, at this juncture in the manufacturing process, is the shaped-workpiece $\mathbf{30}_S$. More specifically, the masking tool assembly 90 includes at least one masking tool 60 for being disposed in combination with predefined surfaces of the shaped-workpiece $30_S$ (discussed in greater detail below), and a clamping means 80 for forcibly urging the masking tool 60 in combination with the shaped-workpiece $30_S$. In the described embodiment, the masking tool 60 is segmented into three (3) tool segments 60*a*, 60*b*, 60*c*, which collectively circumscribe the shaped workpiece $30_S$. Furthermore, the clamping means 80 circumscribes all of the tool segments 60*a*, 60*b*, 60*c* to integrate the masking tool assembly 90.

The masking tool 60 includes a plurality of compliant masking segments 62 which are bonded to and integrated by means of a flexible back-plate 64. In the context used herein, "compliant" means a Shore A hardness of between about 30 to about 65. Each compliant masking segment 62 defines a surface geometry 66 (see FIG. 5*e*) which is substantially complementary to the tooth space surface geometry 68 (hereinafter referred to as the "TS surface") defined by and between adjacent gear teeth 12. In the described embodiment, such TS surface 68 is defined by the surface geometry of the opposed flanks 18 of adjacent teeth and the fillet 20 therebetween. Additionally, the masking tool 60 defines a plurality of open-ended channels 70 between adjacent compliant masking segments 62, which open-ended channels 70 correspond to the location and extend the length of the top lands 14 of the gear teeth 12.

As assembled, the clamping means 80 forcibly urges the masking tool 60, and consequently, the compliant masking segments 62 into superposed engagement with the TS surface 68. That is, the clamping means 80 effects intimate contact of the compliant masking segments 62 with the TS surface 68. In the preferred embodiment, the clamping means 80 effects a contact pressure therebetween of at least 1 $lbs/in^2$ (6940 Pa) and, more preferably, at least 3.5 $lbs/in^2$ (24290 Pa). During the surface deposition step, the masking segments 62 prevent deposition of masking material (not shown) on the TS surface 68 while the open-ended channels permit the masking material to flow over and deposit on the top lands 14 of the gear teeth 12.

In the described embodiment, the compliant masking segments 62 are fabricated from an elastomer material having Shore A Hardness of about 40. Furthermore, the flexible back-plate 64 is fabricated from a metallic material having thickness of about 0.125 inches (0.3175 cm). Moreover, in the preferred embodiment, the flexible back-plate 64 is fabricated from a conductive material which produces a stable metal oxide surface such as stainless steel. As such, the metal oxide surface inhibits adhesion of the masking material to the back-plate 64 during the deposition process.

In the preferred embodiment, the flexible back-plate 64 is conductive and, accordingly, may be charged to augment the surface deposition process. More specifically, when employing copper plate as the masking material, it may be desirable to positively charge the flexible back-plate 64 (i.e., an anode in the electric circuit) by means of a power source PS to draw copper ions inwardly toward the longitudinal center 82 (See FIG. 5*a*) of the gear teeth 12. As such, a more even thickness/distribution of copper plate is formed along the top lands 14 of the gear teeth 12.

While the described embodiment of the masking tool assembly 90 shows three (3) tool segments 60*a*, 60*b*. 60*c*, it will be appreciated that a lesser or greater number of segments may be employed depending upon the type of precision gear, number of gear teeth and/or the diameter of the precision gear. For example, a face or bevel gear may employ a single masking tool opposing the gear teeth wherein the compliant masking segments are substantially radially oriented. For a face gear, the compliant masking segments will be substantially coplanar and, for a bevel gear, the masking segments will collectively define a frustoconical shape. Furthermore, while the described embodiment depicts the flexible back-plate as being substantially solid, it should be appreciated that the back-plate may be perforated, particularly in areas corresponding to the channels 70, to facilitate the surface deposition step. Moreover, while the described embodiment depicts a single strap clamp 80 for integrating the tool segments 60*a*, 60*b*, 60*c*, it will be appreciated that multiple clamping devices may be used, i.e., one or more per tool segment, to retain and engage the tool segments. Using one of the above-described examples, the face gear may be retained and positioned via several C-clamps disposed about the periphery.

Method for Manufacturing the Masking Tool

Figure 5A:
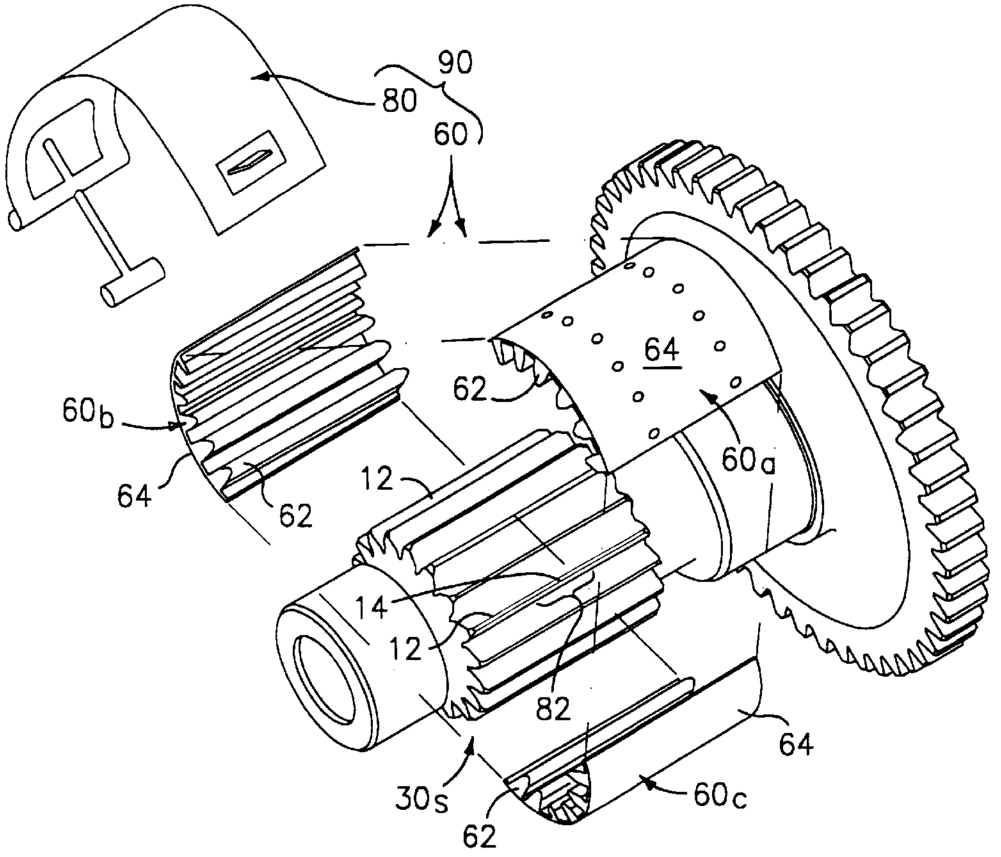
FIGS. 5*a*–5*c* depict the assembly of the masking tool according to the present invention about the shaft end spur gear of the gear shaft.
Figure 5B:
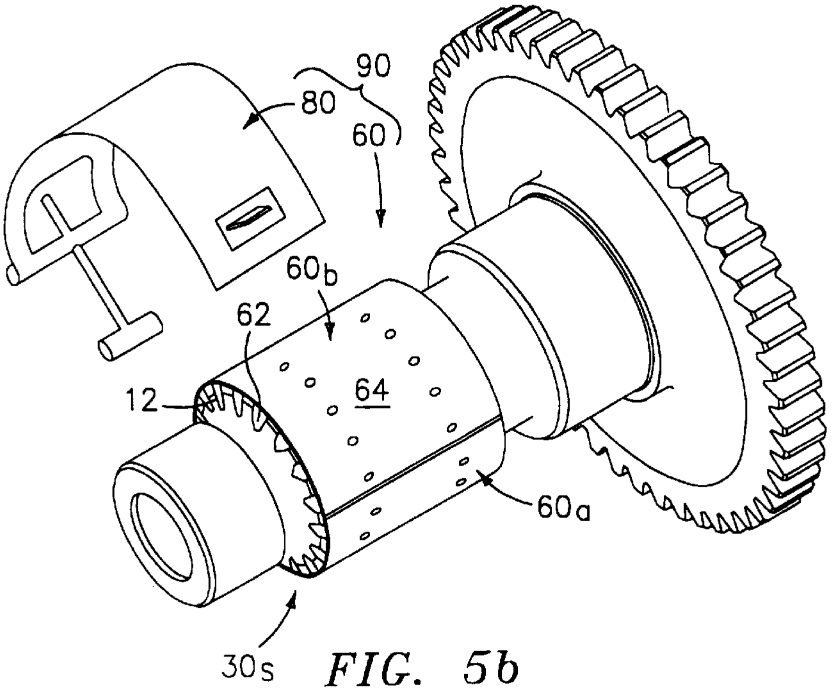
Figure 5C:
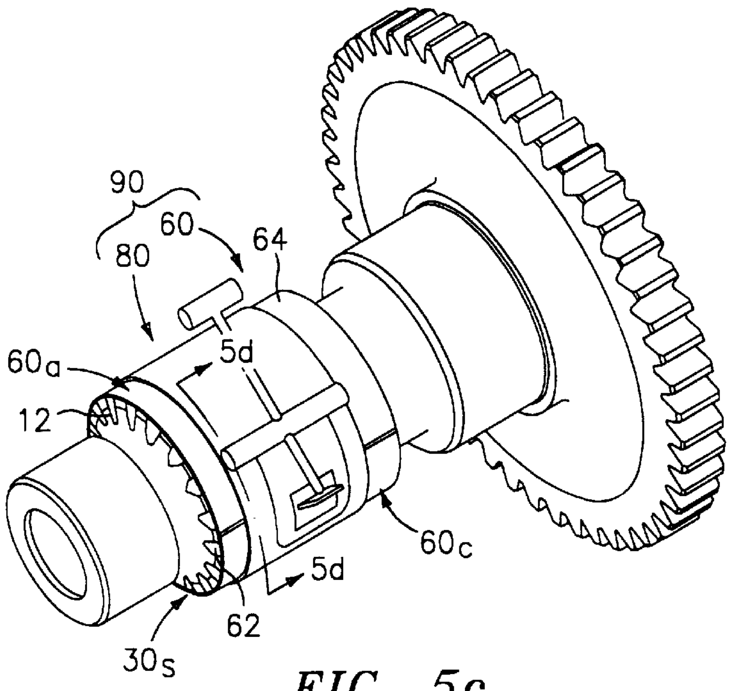
Figure 5E:
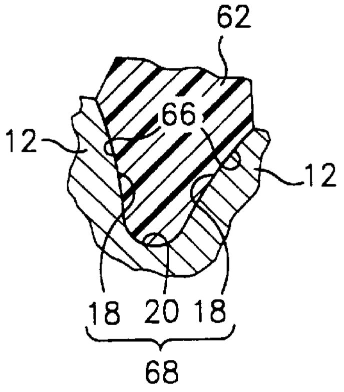
FIG. 5*e* is an enlarged view of one compliant masking segment of the masking tool.
Figure 5D:
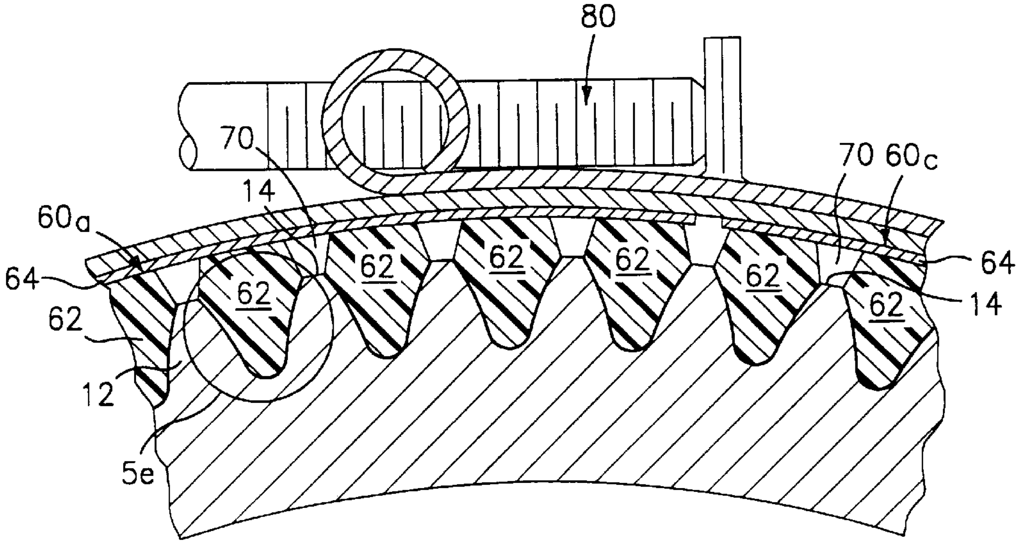
FIG. 5*d* depicts a partial section view taken substantially along line 5*d*–5*d* of FIG. 5*c* for revealing the details of the masking tool assembly, including a plurality of compliant masking segments disposed in combination with the gear teeth of the web end spur gear.

In FIGS. 5*d* and 5*e*, the masking tool 60 may be manufactured by a variety of methods which (i) produce the necessary surface geometry 66 of the compliant masking segments 62, (ii) form the open-ended channels 70 therebetween, and (iii) adhesively bond or otherwise secure the masking segments 62 to the flexible back-plate 64. For example, each compliant masking segment 62 may be machined via computer generated data or a computer-based model, and, subsequently, bonded to the flexible back-plate 64.

In the preferred embodiment, the compliant masking segments 62 are molded directly from a master model of the precision gear or an accurate representation thereof. The model will define the desired contour of the precision gear or, more precisely, the desired contour of the shaped workpiece, assuming that the shaped-workpiece may be either rough- or final-machined. In the broadest sense of this embodiment, the method comprises the steps of: forming an accurate representation of the shaped workpiece defining the TS surface 68 between adjacent gear teeth 12, preparing the surface of the flexible back-plate 64 so as to promote adhesion (e.g., abrasive blast), situating the flexible back-plate 64 proximal to the gear teeth 12, and forming compliant material between the flexible back-plate 64 and the TS surfaces 68 to produce the compliant masking segments 62 and the open-ended channels 70.

Figure 6A:
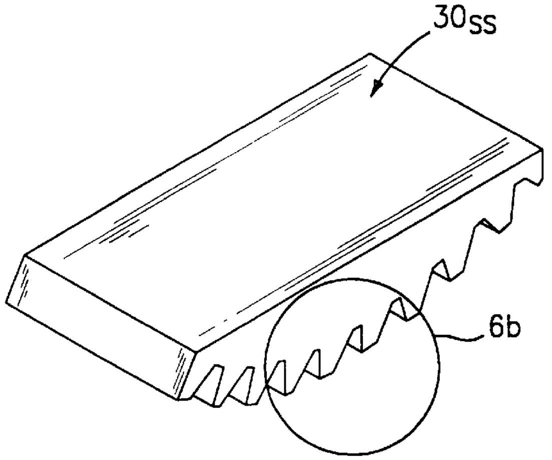
FIGS. 6*a*–6*e* pictorially illustrate an exemplary method of manufacturing the masking tool.
Figure 6B:
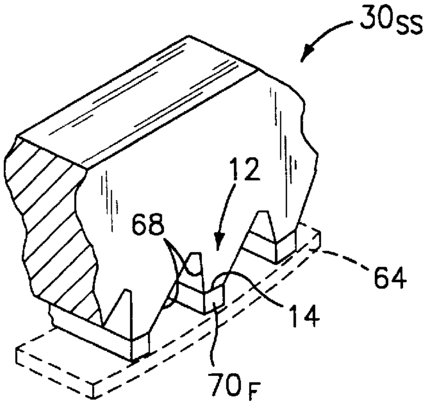
Figure 6C:
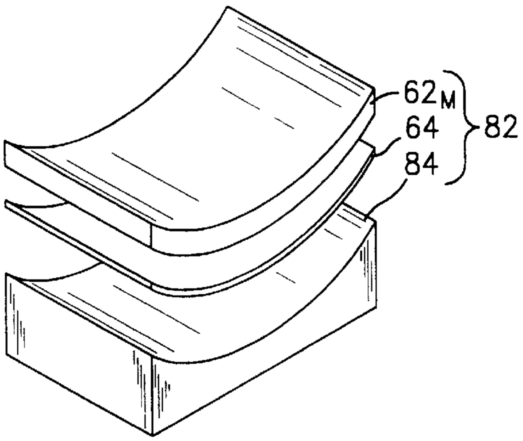
Figure 6D:
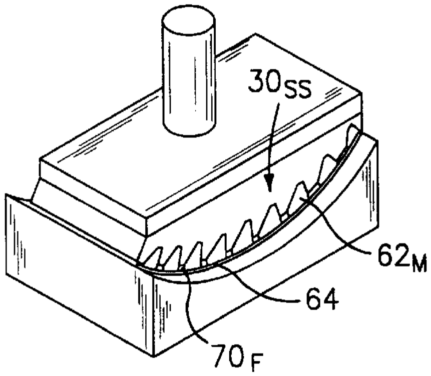
Figure 6E:
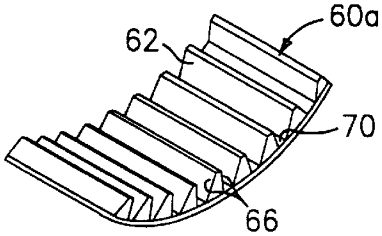

In FIGS. 6*a*–6*e*, an example of such molding method is shown. In this embodiment, and referring to FIG. 6*a*, a representative shaped workpiece has been cut into workpiece segments wherein one such segment $30_{SS}$ is shown for producing a tool segment 60*a* (FIG. 6*e*). In FIG. 6*b*, the workpiece segment $30_S$ has been modified to include filler strips $70_F$ which are bonded to the top lands 14 of each gear tooth 12. The filler strips $70_F$ function to mold and define the channels 70 of the tool segment 60*a* while, furthermore, establishing the necessary separation distance between the flexible back-plate 64 and the workpiece segment $30_{SS}$. Furthermore, the flexible back-plate 64 has been adhesively-treated in preparation for a subsequent press molding step.

Referring to FIG. 6*c*, a lower mold assembly 82 is assembled by stacking the flexible back-plate 64 and a sheet of compliant material $62_M$ in combination with a lower die or cradle 84. Upon set-up, and referring to FIG. 6*d*, the workpiece segment $30_{SS}$ is press molded into the sheet of compliant material $62_M$ under heat and pressure. During this step, the workpiece segment $30_{SS}$ penetrates the compliant material $62_M$ until the filler strips $7_F$ abut the flexible back-plate 64. Furthermore, the compliant material $62_M$ conforms to the shape of the workpiece segment $30_{SS}$ and bonds to the flexible back-plate 64. After cooling, the press-molded tool segment 60*a* is trimmed to remove excess compliant material $62_M$.

By using a master model of the precision gear or accurate representation thereof, the molding method ensures that the surface geometry 66 of each compliant segment 62 is complementary to the TS surface 68 (FIG. 6*b*) and will repeatably establish the necessary sealing/masking from one precision gear to the next.

SUMMARY

The precision gear manufacturing method described above and the masking tool 60 for use therein eliminates laborious operational steps, simplifies fabrication steps to reduce the potential for fabrication errors and improves the structural properties of the precision gear. Firstly, the method and masking tool 60 permit shaping of the workpiece prior to surface deposition which operational sequence minimizes the required handling of the material-masked workpiece prior to hardening. Accordingly, damage to the masking material and the requirement for laborious touch-up is eliminated. Secondly, the propensity for operator error, i.e., inadvertent oversight of an unplated region or inadvertent spillage of carbon stop-off material, is negated with the elimination of the touch-up operation. Accordingly, the structural and fiscal disadvantages associated therewith are eliminated.

Finally, by permitting shaping prior to surface deposition, the chamfered edges 110 may be formed and masked prior to hardening. Accordingly, these areas are less susceptible to "tooth capping" which improves the structural properties of the completed precision gear.

Although the invention has been shown and described with respect to exemplary embodiments thereof, it should be understood by those skilled in the art that other changes, omissions and additions may be made therein and thereto, without departing from the spirit and scope of the present invention.

What is claimed is:

1. A method for manufacturing a masking tool (60) for use in combination with a shaped-workpiece in the manufacture of a precision gear (10), comprising the steps of:

a) forming an accurate representation of the shaped workpiece ($30_S$) defining tooth space surfaces (68) between adjacent gear teeth (12);

b) preparing a surface of a flexible back-plate (64) so as to promote adhesion;

c) situating said flexible back-plate (64) proximal to the gear teeth (12); and d) forming a compliant material between said flexible back-plate (64) and the tooth space surfaces (68) so as to produce a plurality of compliant masking segments (62) each having a surface geometry complementary to the respective tooth space surface (68) and defining an open-ended channel (70) between adjacent masking segments (62).

2. The method according to claim 1 further comprising the steps of:

e) providing a workpiece segment ($30_{SS}$) of the shaped workpiece ($30_S$);

f) forming a filler strip ($70_F$) in combination with a top land (14) of each gear tooth (12) of said workpiece segment ($30_S$);

g) stacking an assemblage of said flexible back-plate (64) and a sheet of compliant material ($62_M$) onto a molding die (84) to form a lower mold assembly (82); and h) press molding said workpiece segment ($30_{SS}$) in combination with said lower mold assembly (82) such that said compliant material ($62_M$) is molded against said tooth space surface (68) to form said compliant masking segments (62) and said filler strips ($70_F$) abut said flexible back-plate (64).

* * * * *